US006207923B1

(12) United States Patent
Lindsay

(10) Patent No.: US 6,207,923 B1
(45) Date of Patent: Mar. 27, 2001

(54) PLASMA ARC TORCH TIP PROVIDING A SUBSTANTIALLY COLUMNAR SHIELD FLOW

(75) Inventor: Jon W. Lindsay, West Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 09/186,791

(22) Filed: Nov. 5, 1998

(51) Int. Cl.[7] .................................................... B23K 9/00
(52) U.S. Cl. ................................... 219/121.5; 219/121.48
(58) Field of Search ............................ 219/121.5, 121.48, 219/75, 121.49, 121.39

(56) References Cited

U.S. PATENT DOCUMENTS

| | | | | |
|---|---|---|---|---|
| 4,558,201 | | 12/1985 | Hatch | 219/121 PM |
| 4,564,740 | | 1/1986 | Paton et al. | 219/121 PM |
| 4,590,354 | | 5/1986 | Marhic et al. | 219/121 PM |
| 4,650,953 | | 3/1987 | Eger et al. | 219/121 PQ |
| 4,716,269 | | 12/1987 | Carkhuff | 219/121 PQ |
| 4,791,268 | | 12/1988 | Sanders et al. | 219/121.57 |
| 4,861,962 | | 8/1989 | Sanders et al. | 219/121.5 |
| 4,866,240 | | 9/1989 | Webber | 219/121.47 |
| 4,866,246 | | 9/1989 | Church | 219/137 R |
| 4,902,871 | | 2/1990 | Sanders et al. | 219/121.49 |
| 4,967,055 | | 10/1990 | Raney et al. | 219/121.5 |
| 4,973,816 | | 11/1990 | Haberman | 219/121.48 |
| 5,013,885 | | 5/1991 | Carkhuff et al. | 219/121.5 |
| 5,132,512 | | 7/1992 | Sanders et al. | 219/121.5 |
| 5,208,442 | * | 5/1993 | Ahola et al. | 219/121.52 |
| 5,216,221 | | 6/1993 | Carkhuff | 219/121.51 |
| 5,247,152 | * | 9/1993 | Blankenship | 219/121.49 |
| 5,317,126 | | 5/1994 | Couch, Jr. et al. | 219/121.51 |
| 5,597,497 | * | 1/1997 | Dean et al. | 219/121.48 |
| 5,660,743 | * | 8/1997 | Nemchinsky | 219/121.5 |
| 5,681,489 | * | 10/1997 | Carkhuff | 219/121.48 |
| 5,695,662 | | 12/1997 | Couch, Jr. et al. | 219/121.39 |
| 5,726,415 | * | 3/1998 | Luo et al. | 219/121.48 |
| 5,856,647 | * | 1/1999 | Luo | 219/121.5 |
| 5,994,663 | * | 11/1999 | Lu | 219/121.51 |

FOREIGN PATENT DOCUMENTS

| | | | |
|---|---|---|---|
| 40 18 423 A1 | 12/1991 | (DE) | B23K/10/00 |
| 0 178 288 | 4/1986 | (EP) | H05H/1/34 |
| 0 417 595 A1 | 9/1990 | (EP) | B23K/35/38 |
| 0 727 922 A1 | 8/1996 | (EP) | H05H/1/34 |
| 1 453 100 | 10/1976 | (GB) | H05H/1/26 |
| 2059846 | 4/1981 | (GB) | B23K/9/16 |
| 62-176685 | 8/1987 | (JP) | B23K/9/26 |
| 62-61393 | 12/1987 | (JP) | B23K/9/26 |
| 64-44283 | 2/1989 | (JP) | B23K/9/26 |

(List continued on next page.)

OTHER PUBLICATIONS

International Search Report in corresponding PCT/US99/23278.

*Primary Examiner*—Teresa Walberg
*Assistant Examiner*—Quang Van
(74) *Attorney, Agent, or Firm*—Testa, Hurwitz & Thibeault, LLP

(57) ABSTRACT

A plasma arc torch which includes a torch body having a nozzle mounted relative to an electrode in the body to define a plasma chamber. The torch body includes a plasma flow path for directing a plasma gas to the plasma chamber in which a plasma arc is formed. The nozzle includes a hollow, body portion and a substantially solid, head portion defining an exit orifice. The torch also includes a shield attached to the torch body. The shield has a head portion and a body portion which defines a shield exit orifice that has an inlet and an outlet. The shield exit orifice is dimensioned such that the head portion of the nozzle extends, at least in part, to a position between the inlet and the outlet of the shield exit orifice. This configuration produces a substantially columnar flow of shield gas that does not substantially interfere with the plasma arc and prevents a substantial portion of splattered molten metal produced during marking or cutting of the workpiece from reaching the nozzle.

17 Claims, 3 Drawing Sheets

FOREIGN PATENT DOCUMENTS

| | | | |
|---|---|---|---|
| 1-148464 | 6/1989 | (JP) | B23K/9/00 |
| 1-150478 | 6/1989 | (JP) | B23K/9/26 |
| 1-150479 | 6/1989 | (JP) | B23K/9/26 |
| 2-37977 | 2/1990 | (JP) | B23K/10/00 |
| 2-290679 | 11/1990 | (JP) | B23K/10/00 |
| 5-135896 | 6/1993 | (JP) | H05H/1/30 |
| 6-52995 | 2/1994 | (JP) | H05H/1/30 |
| 751540 | 7/1980 | (SU) | B23K/9/16 |

* cited by examiner

PLASMA ARC TORCH TIP PROVIDING A SUBSTANTIALLY COLUMNAR SHIELD FLOW

FIELD OF THE INVENTION

The present invention relates to plasma arc torches, and more particularly to plasma arc torches having a torch tip designed to produce a substantially columnar shield flow that surrounds the plasma arc without substantially interfering with the plasma arc.

BACKGROUND OF THE INVENTION

Plasma arc torches are widely used in the cutting or marking of metallic materials. A plasma torch generally includes an electrode mounted therein, a nozzle with a central exit orifice mounted within a torch body, electrical connections, passages for cooling and arc control fluids, a swirl ring to control fluid flow patterns in the plasma chamber formed between the electrode and nozzle, and a power supply. The torch produces a plasma arc, which is a constricted ionized jet of a plasma gas with high temperature and high momentum. Gases used in the torch can be non-reactive (e.g. argon or nitrogen), or reactive (e.g. oxygen or air).

In operation, a pilot arc is first generated between the electrode (cathode) and the nozzle (anode). Generation of the pilot arc may be by means of a high frequency, high voltage signal coupled to a DC power supply and the torch or any of a variety of contact starting methods.

One known configuration of a plasma arc torch includes an electrode and a nozzle mounted in a special relationship relative to a shield. The nozzle is surrounded by the shield and aligned relative to a longitudinal axis extending through the nozzle and the shield such that the nozzle orifice and shield orifice are concentric relative to one another. A relatively small plasma gas flow passes through the torch and exits through the nozzle orifice. A relatively large shield gas flow passes through the space between the nozzle and the shield. The plasma gas flow passes through the nozzle exit orifice along the axis, while the shield gas flow passes through the gap at an angle relative to the axis. As such the shield flow impinges on the plasma gas flow. After impingement, the plasma arc and shield flows pass through the shield orifice together. This process can disrupt the plasma gas flow, encouraging shield gas entrainment which can result in a degraded cutting performance.

It is therefore the object of the present invention to provide an improved torch tip for a plasma arc torch, which provides a substantially columnar shield flow that does not substantially interfere with the plasma arc.

SUMMARY OF THE INVENTION

In one aspect, the invention features a plasma arc torch for cutting or marking a metallic workpiece. The torch includes a torch body having a nozzle mounted relative to an electrode in the body to define a plasma chamber. The torch body includes a plasma flow path for directing a plasma gas to the plasma chamber. The torch also includes a shield attached to the torch body. The nozzle, electrode and shield are consumable parts that wear out and require periodic replacement.

The nozzle has a hollow body portion and a substantially solid head portion formed integrally with the body portion. In one embodiment, the body portion comprises a conical section and a cylindrical section. The head portion is cylindrically shaped and defines a nozzle exit orifice that extends through the head portion. The shield includes a body portion with a fastening mechanism (e.g., threads or an interference fit) for securing the shield to the torch body in a spaced relationship relative to the nozzle. In one embodiment, the shield body portion comprises a conical section and a cylindrical section. A shield gas passes through the space between the shield body and the body portion of the nozzle. The shield also has a head portion formed integrally with the body portion which defines a shield exit orifice that has an inlet and an outlet. In one embodiment, the shield head portion is cylindrically shaped. The shield exit orifice is dimensioned such that the head portion of the nozzle extends, at least in part, to a position between the inlet and the outlet of the shield exit orifice. The position of the nozzle head portion between the inlet and outlet of the shield exit orifice (1) provides a substantially columnar flow of shield gas that passes through a gap between the inner surface of the shield head portion and the outer surface of the nozzle head portion and passes through the shield exit orifice without substantially interfering with the plasma arc and (2) prevents a substantial portion of splattered molten metal produced during marking or cutting of the workpiece from reaching the nozzle.

In another aspect, the invention features a torch tip for a plasma arc torch for cutting or marking a metallic workpiece. The torch tip includes a nozzle and a shield mounted in a mutually spaced relationship. The nozzle has a hollow body portion and a substantially solid head portion formed integrally with the body portion. In one embodiment, the body portion comprises a conical section and a cylindrical section. The head portion is cylindrically shaped and defines a nozzle exit orifice that extends through the head portion.

The shield includes a body portion with a fastening mechanism for securing the shield in a spaced relationship relative to the nozzle. In one embodiment, the body portion comprises a conical section and a cylindrical section. A shield gas passes through a space between the shield body and a body portion of the nozzle. The shield includes a head portion formed integrally with the body portion and which defines a shield exit orifice having an inlet and an outlet. The shield exit orifice is dimensioned such that the head portion of the nozzle extends, at least in part, to a position between the inlet and the outlet of the shield exit orifice. The position of the nozzle head portion relative to the inlet and outlet of the shield exit orifice (1) results in a substantially columnar flow of shield gas that passes through a gap between the inner surface of the shield head portion and the outer surface of the nozzle head portion and passes through the shield exit orifice without substantially interfering with the plasma arc and (2) prevents a substantial portion of splattered molten metal produced during marking or cutting of the workpiece from reaching the nozzle. In one detailed embodiment, the gap formed between the shield head portion and the nozzle head portion is an annular gap.

In yet another aspect, the invention features a shield for a plasma arc torch for cutting or marking a metallic workpiece. The plasma arc torch includes a nozzle mounted relative to an electrode in the torch body to define the plasma chamber. The torch body includes a plasma flow path for directing a plasma gas to a plasma chamber in which a plasma arc is formed.

The shield includes a body portion with a fastening mechanism for securing the shield to the torch body in a spaced relationship relative to the nozzle. In one embodiment, the body portion comprises a conical section and a cylindrical section. A shield gas passes through a space between the shield body and a body portion of the nozzle. The shield also has a head portion formed integrally with the body portion which defines a shield exit orifice that has an inlet and an outlet. In one embodiment, the shield head portion is cylindrically shaped. The shield exit orifice is dimensioned to receive the head portion of the nozzle so that the nozzle extends, at least in part, to a position between the inlet and the outlet of the shield exit orifice. This configuration produces a substantially columnar flow of shield gas that exits the torch without substantially interfering with the plasma arc and prevents a substantial portion of splattered molten metal produced during marking or cutting of the workpiece from reaching the nozzle.

In one detailed embodiment, the shield exit orifice can have a length to diameter ratio in the range of 0.50 to 1.00. In addition, the shield can have multiple vent holes formed in the shield body.

In yet another aspect, the invention features a nozzle for use in a plasma arc torch for marking or cutting a metallic workpiece. The torch has a hollow torch body including a plasma chamber in which a plasma arc is formed, A shield is secured in a spaced relationship relative to the nozzle in the torch body and defines a shield exit orifice.

The nozzle includes a hollow body portion and a substantially solid nozzle head portion formed integrally therewith. In one embodiment, the body portion comprises a conical section and a cylindrical section. The head portion defines a nozzle exit orifice having a length to diameter ratio in the range of 3 to 4. The nozzle head portion has a cylindrically shaped outer surface to facilitate a substantially columnar flow of shield gas that passes through a gap between the outer surface of the nozzle head portion and an inner surface of the shield.

DETAILED DESCRIPTION OF THE INVENTION

Figure 1:
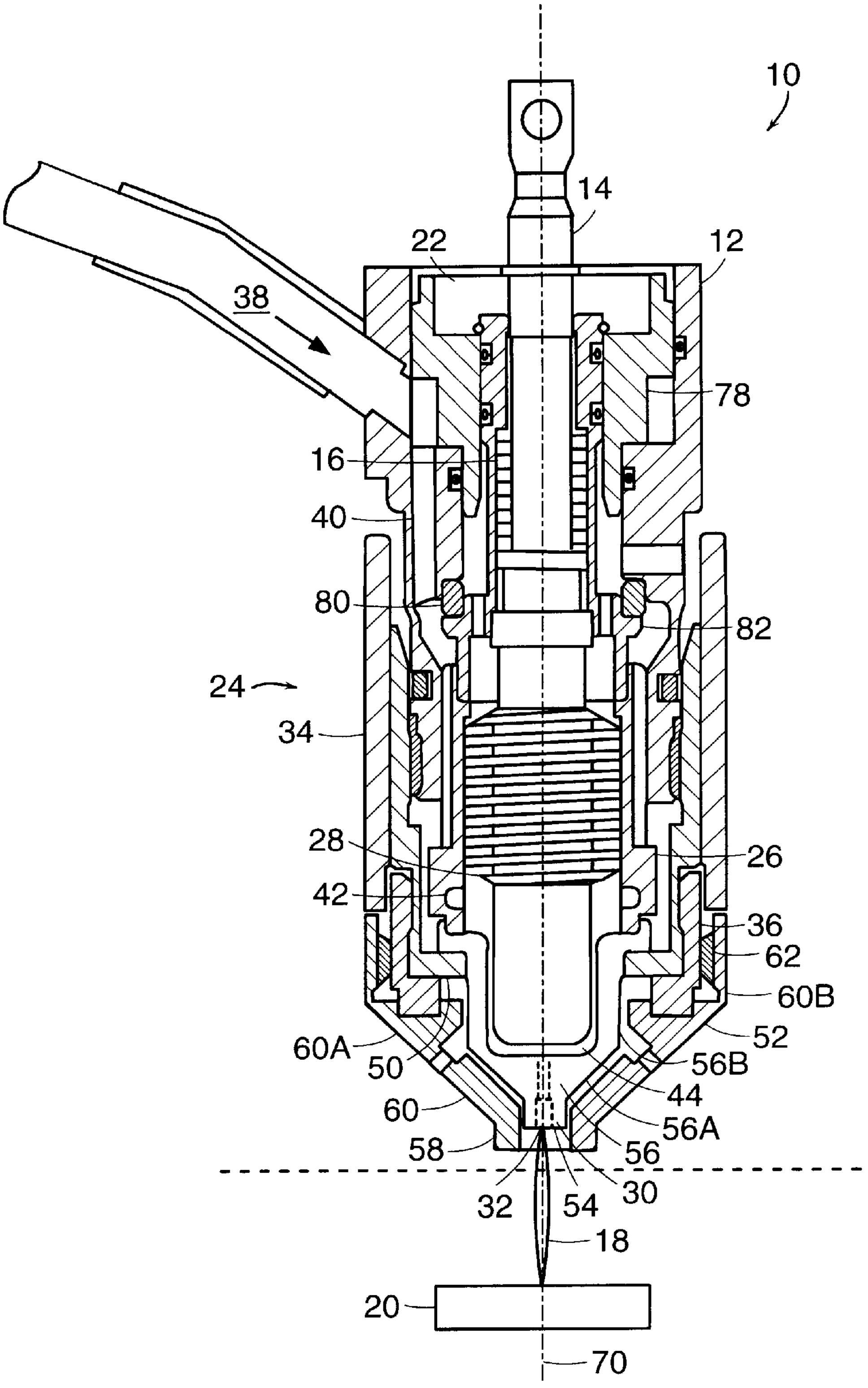
FIG. 1 is a cross-sectional view of one embodiment of a plasma arc torch according to the invention.

FIG. 1 shows a plasma arc torch 10 embodying the principles of the invention. A plasma arc 18, i.e., an ionized gas jet, exits the torch 10 through an orifice 64 (FIG. 2) and attaches to a workpiece 20 being processed. The torch 10 is designed to pierce and cut metallic workpieces, particularly mild steel, or other materials in a transferred arc mode. In cutting mild steel, the torch 10 operates with a reactive gas, such as oxygen or air, as the plasma gas to form the transferred plasma arc 18.

The torch 10 includes a first body portion 22 and a second body portion 24. The first body portion 22 comprises a torch body 12, a plunger 14, a plunger spring 16, a pair of insulating members 78, 80, and a cathode block 82. The torch body 12 is formed of a conductive material (e.g. brass). The plunger 14 is surrounded by the plunger spring 16, which is biased to drive the plunger downwardly, as shown. The first insulating member 78 is positioned between an upper portion of the cathode block 82 and the torch body 12. The second insulating member 80 is positioned between a lower portion of the cathode block 82 and the torch body 12.

The second portion 24 comprises various consumable components, including a swirl ring 26, an electrode 28, a nozzle 30, a shield 52, a retaining cap 34 and an insulating ring 36. In one embodiment, the cap 34 and the insulating ring 36 are an integral assembly. The electrode 28 and the nozzle 30 are mounted in the body 12 and, along with the swirl ring 26, define a plasma chamber 44. The retaining cap 34, which is fastened onto the outer body component 24, secures the nozzle 30 and the swirl ring 26 in the torch body 12. The shield 52 is secured to the retaining cap 34 in a spaced relationship relative to the nozzle 30. The insulating ring 36 is formed from a nonconductive material, so the shield is electrically floating. When assembled in the torch 10, the shield 52, the nozzle 30, and the retaining cap 34 are collinearly disposed about a longitudinal axis 70 extending through the torch body 12.

The plasma arc torch shown in FIG. 1 employs a contact starting process. However, other starting processes can be utilized without departing from the scope of the invention. When the torch is in its starting position (not shown), the plunger 14 is driven downward by the spring 16. The spring force causes the electrode 28 to contact the nozzle 30, creating an electrical short between the electrode and the nozzle.

To start the torch, a current passes between the electrode 28 and the nozzle 30 and a pressurized gas flow 38 enters the torch through the passage 40, passing through the canted ports 42 in the swirl ring 26, and entering the plasma chamber 44. A portion of the gas flow passes through the ports 40, through the orifices 50 and exits the torch through the shield exit orifice 64 as a shield gas flow 46. A portion of the shield gas flow 46 passes through the shield vent holes 76. A pressure differential across the electrode, caused by the plasma gas flow in the chamber 44, creates a force that acts on the end face and the lower surface of the spiral grooves of the electrode 28. When the force caused by the pressure differential exceeds the spring force, the electrode moves away from the nozzle 30. As the electrode moves, a pilot arc is drawn between the electrode 28 and the nozzle 30. The arc transfers from the nozzle 30 to the workpiece 20 for the cutting or marking of the workpiece 20. The particular construction details of the torch, including the arrangement of components, directing of gas and cooling fluid flows, and providing electrical connections can take a wide variety of forms.

Figure 2:
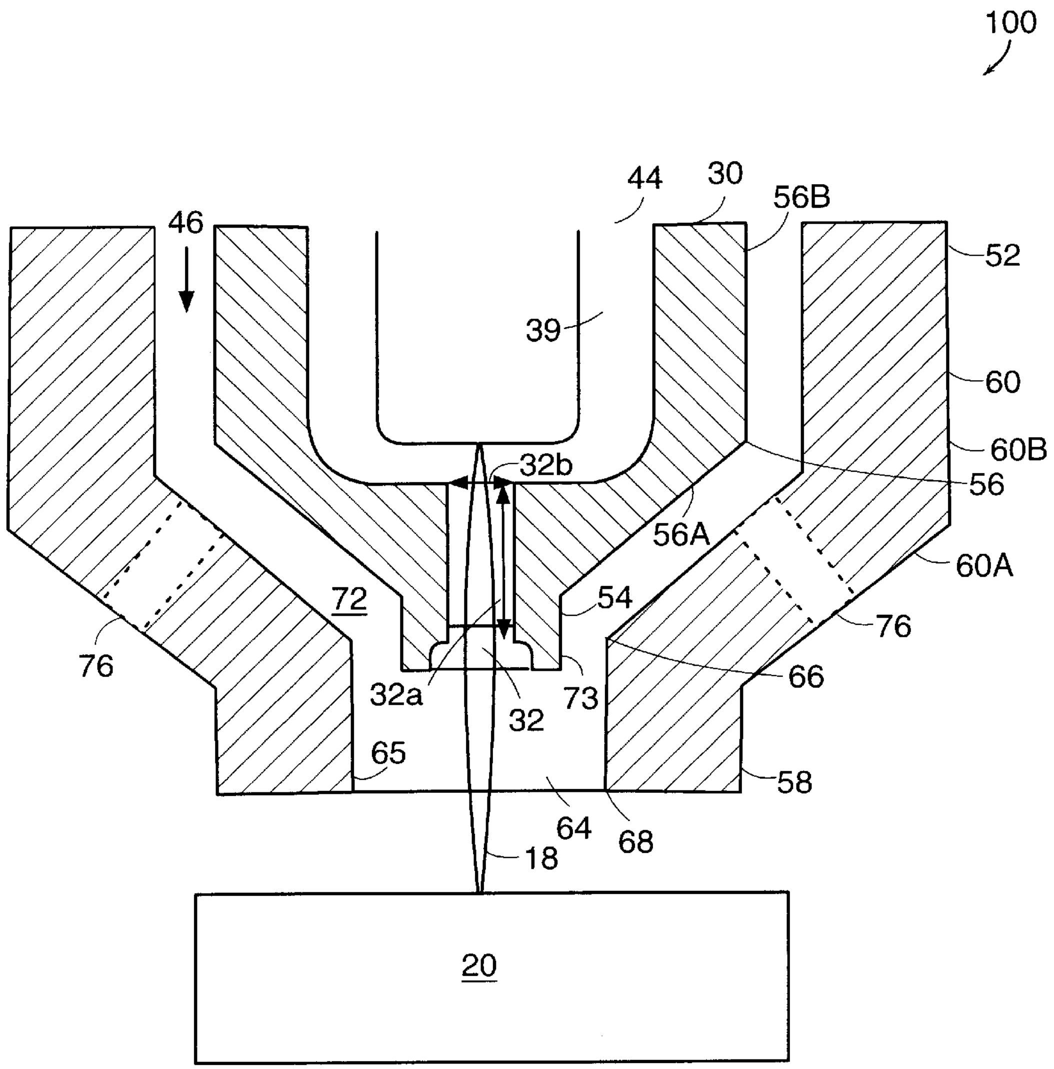
FIG. 2 is a simplified cross-sectional view of the torch tip of the plasma arc torch of FIG. 1.

FIG. 2 is an illustration of a plasma arc torch tip 100 embodying the principles of the present invention. The main components of the torch tip 100 are the nozzle 30 and shield 52, which are collinearly disposed relative to the longitudinal axis 70 such that the nozzle exit orifice 32 and the shield orifice 64 are concentric relative to one another. The nozzle 30 has a hollow body portion 56, which comprises a conical section 56A and a cylindrical section 56B, and a substantially solid head portion 54 formed integrally with the body portion. The nozzle head portion 54 defines a nozzle exit orifice 32 extending through the nozzle 30 having a length to diameter ratio in the range of 3 to 4. The nozzle head portion has a cylindrical shape, to facilitate a substantially columnar flow of shield gas that passes through a gap 72 formed between an outer surface 73 of the nozzle head portion and an inner surface 65 of the shield.

Figure 3:
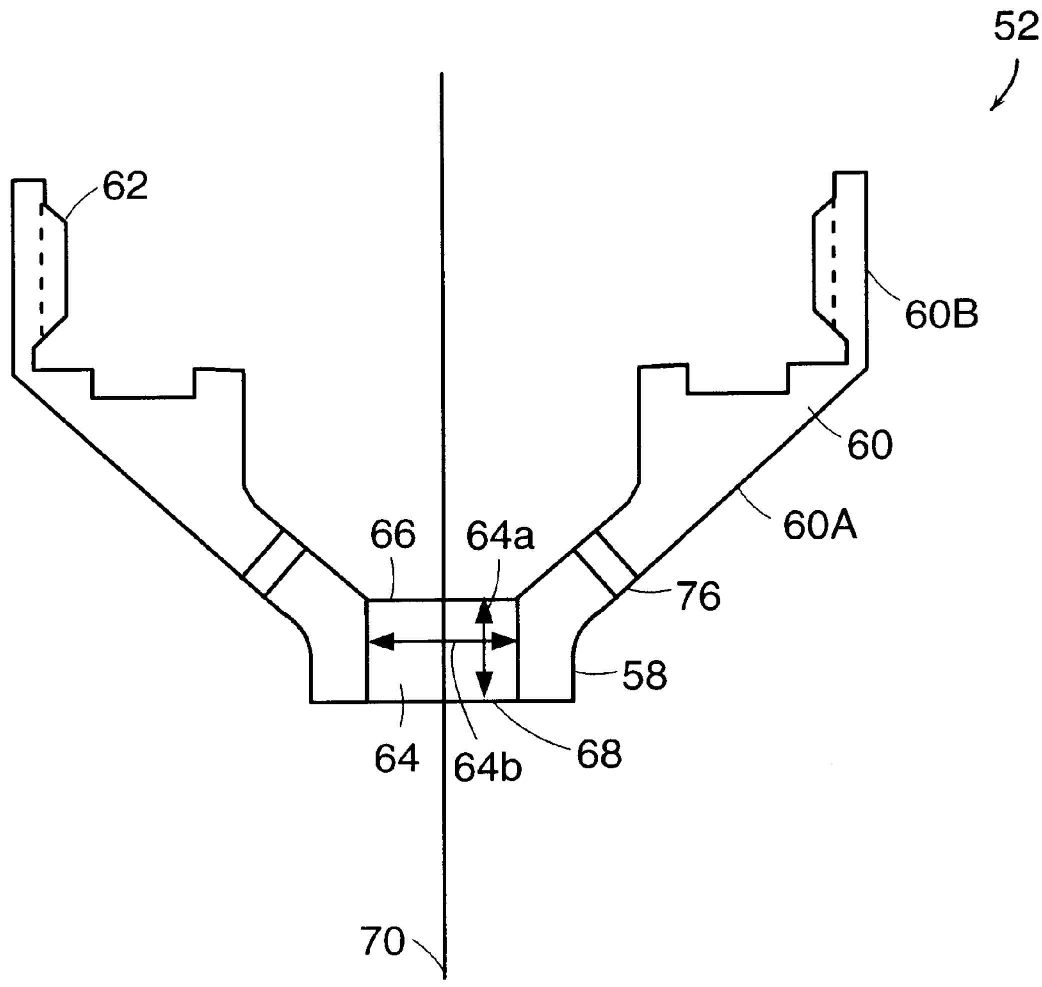
FIG. 3 is a cross-sectional view of the shield of the torch tip of FIG. 2.

With reference to FIGS. 2 and 3, the shield 52 has a body portion 60 which comprises a conical section 60A and a cylindrical section 60B. A fastening mechanism 62 (e.g., threads or an interference fit) is disposed on the cylindrical section 60B for securing the shield to the insulating ring 36. The shield 52 includes a cylindrically shaped head 58 formed integrally with the body portion 60. The vent holes 76 are formed in the conical section 60A of the shield body 60. The head 58 defines a shield exit orifice 64 having an inlet 66 and an outlet 68. As shown, the shield exit orifice 64 is dimensioned such that the head portion of the nozzle 54 extends to a position between the inlet 66 and outlet 68 of the shield exit orifice 64. Thus, when the nozzle and shield are assembled in the torch, the annular gap 72 is formed. The gap 72 is defined by the outer surface 73 of the nozzle head portion 54 and the inner surface 65 of the shield exit orifice 64. This cylindrical gap 72 causes the shield gas flow 46 to exit through the shield exit orifice 64 as a substantially columnar flow. In addition, the shield exit orifice 64 is sufficiently large so that the columnar shield gas flow surrounds, but does not substantially interfere with the plasma arc 18 and is sufficiently small to prevent a substantial portion of splattered molten metal produced during marking or cutting of the workpiece 20 from impinging on the nozzle 30. In one detailed embodiment, the shield exit orifice has a diameter in the range of 0.05 inches to 0.20 inches and a length in the range of 0.025 inches to 0.20 inches.

In one detailed embodiment, the shield exit orifice 64 has a length (64*a*) to diameter (64*b*) ratio of greater than 0.50, and the nozzle exit orifice 32 has a length (32*a*) to diameter (32*b*) ratio of greater than 3.00. In addition, the gap 72 is an annular gap having a width of 0.0125. It is noted that in calculating the length to diameter ratio for the nozzle, the narrowest diameter 32*b* of exit orifice 32 is used (i.e. not the diameter of the counterbore). In another detailed embodiment, the shield exit orifice 64 has a length (64*a*) to diameter (64*b*) ratio between about 0.50 and 1.00, and the nozzle exit orifice 32 has a length (32*a*) to diameter 32*b* ratio between about 3.00 and 4.00.

By way of example only, a shield manufactured by Hypertherm, Inc., has a shield exit orifice with a length to diameter ratio of 0.73. A nozzle manufactured by Hypertherm, Inc. has a nozzle exit orifice with a length to diameter ratio of 3.4. The foregoing are merely representative embodiments, as other configurations are possible and within the scope of the inventions.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A plasma arc torch for marking or cutting a metallic workpiece, the plasma arc torch comprising:

a torch body including a plasma flow path for directing a plasma gas to a plasma chamber in which a plasma arc is formed;

a nozzle mounted relative to an electrode in the torch body to define the plasma chamber, the nozzle comprising a hollow nozzle body portion and a substantially solid nozzle head portion formed integrally with the nozzle body portion and defining a nozzle orifice extending therethrough; and a shield which includes (1) a shield body portion with a fastening mechanism for securing the shield to the torch body in a spaced relationship relative to the nozzle such that a shield gas passes through a space between the shield body and the nozzle body portion and (2) a shield head portion formed integrally with the shield body portion and defining a shield exit orifice having an inlet and an outlet, the shield exit orifice dimensioned such that the nozzle head portion extends to a position between the inlet and the outlet of the shield exit orifice (a) to provide a substantially columnar flow of the shield gas that passes through a gap between the shield head portion and the nozzle head portion, the substantially columnar flow surrounding the plasma arc without substantially interfering with the plasma arc, and (b) such that the nozzle head portion is recessed within the shield head portion relative to said outlet of said shield exit orifice to prevent a substantial portion of splattered molten metal produced during marking or cutting of the workpiece from reaching the nozzle.

2. The plasma arc torch of claim 1 wherein the gap between the shield head portion and the nozzle head portion is an annular gap.

3. The plasma arc torch of claim 1 wherein the shield further comprises a plurality of vent holes.

4. The plasma arc torch of claim 1 wherein at least one of the nozzle head portion and the shield head portion is generally cylindrical.

5. The plasma arc torch of claim 1 wherein the nozzle body portion has a cylindrical section and a conical section.

6. The plasma arc torch of claim 1 wherein the shield body portion has a cylindrical section and a conical section.

7. The plasma arc torch of claim 1 wherein the shield exit orifice has a length to diameter ratio in the range from about 0.50 to about 1.00.

8. A torch tip for a plasma arc torch for marking or cutting a metallic workpiece, the plasma arc torch having a hollow torch body which includes a plasma chamber in which a plasma arc is formed, the torch tip comprising:

a nozzle mounted relative to an electrode in the torch body to define the plasma chamber, the nozzle comprising a hollow nozzle body portion and a substantially solid nozzle head portion formed integrally with the nozzle body portion and defining a nozzle exit orifice extending therethrough; and a shield which includes (1) a shield body portion with a fastening mechanism for securing the shield to the torch body in a spaced relationship relative to the nozzle such that a shield gas passes through a space between the shield body and the nozzle body portion and (2) a shield head portion formed integrally with the shield body portion and defining a shield exit orifice having an inlet and an outlet, the shield exit orifice dimensioned such that the nozzle head portion extends to a position between the inlet and the outlet of the shield exit orifice (a) to provide a substantially columnar flow of the shield gas that passes through a gap between the shield head portion and the nozzle head portion, the substantially columnar flow surrounding the plasma arc without substantially interfering with the plasma arc and (b) such that the nozzle head portion is recessed within the shield head portion relative to said outlet of said shield exit orifice to prevent a substantial portion of splattered molten metal produced during marking or cutting of the workpiece from reaching the nozzle.

9. The torch tip of claim 8 wherein the gap between the shield head portion and the nozzle head portion is an annular gap.

10. The torch tip of claim 8 wherein at least one of the nozzle head portion and the shield head portion is generally cylindrical.

11. The torch tip of claim 8 wherein at least one of the nozzle body portion and the shield body portion has a cylindrical portion and a conical portion.

12. The torch tip of claim 8 where the shield exit orifice has a length to diameter ratio in the range from about 0.50 to about 1.00.

13. A shield for a plasma arc torch for marking or cutting a metallic workpiece, the plasma arc torch having a torch body and an electrode and a nozzle mounted in the torch body to define a plasma chamber in which a plasma arc is formed, the nozzle having a nozzle exit orifice through which the plasma arc passes, the shield comprising:

a hollow shield body having (1) a generally cylindrically shaped shield upper body portion with a fastening mechanism for securing the shield to the torch body in a spaced relationship relative to the nozzle such that a shield gas passes through a space between the shield body and a nozzle body portion and (2) a substantially conically shaped shield lower body portion, formed integrally from the shield upper body portion; and a shield head portion formed integrally with the shield lower body portion and defining a shield exit orifice having an inlet and an outlet, the shield exit orifice dimensioned such that a nozzle head portion can extend to a position between the inlet and the outlet of the shield orifice (1) to provide a substantially columnar flow of the shield gas that passes through a gap between the shield head portion and the nozzle head portion, the substantially columnar flow surrounding the plasma arc without substantially interfering with the plasma arc and (2) such that the nozzle head portion is recessed within the shield head portion relative to said outlet of said shield exit orifice to prevent a substantial portion of splattered molten metal produced during marking or cutting of the workpiece from reaching the nozzle.

14. The shield of claim 13 wherein the shield head portion is generally cylindrical.

15. The shield of claim 13 wherein the nozzle body portion has a cylindrical portion and a conical portion.

16. The shield of claim 13 where the shield exit orifice has a length to diameter ratio in the range from about 0.5 to about 1.0.

17. A method of operating a plasma arc torch for marking or cutting a metallic workpiece, the method comprising:

providing a torch body which includes a plasma chamber formed by mounting a nozzle in a spaced relationship relative to an electrode, the nozzle comprising a hollow nozzle body portion and a substantially cylindrical solid nozzle head portion formed integrally with the nozzle body portion and defining a nozzle exit orifice extending therethrough;

securing a shield, comprising a shield body and a shield head defining a shield exit orifice, to the torch body in a spaced relationship relative to the nozzle such that the nozzle head portion extends to a position between an inlet and an outlet of the shield exit orifice passing a plasma gas to the plasma chamber to form a plasma arc therein;

passing the shield gas through the space between the shield body and the nozzle body portion (1) to provide a substantially columnar flow of shield gas surrounding the plasma arc without substantially interfering with the plasma arc and (2) such that the nozzle head portion is recessed within the shield head portion relative to said outlet of said shield exit orifice to prevent a substantial portion of splattered molten metal produced during marking or cutting of the workpiece from reaching the nozzle.

* * * * *